Nov. 14, 1933.  J. WILLMANN  1,935,235
FOAM PREVENTION IN TREATMENT OF MILK, ETC
Filed June 30, 1931
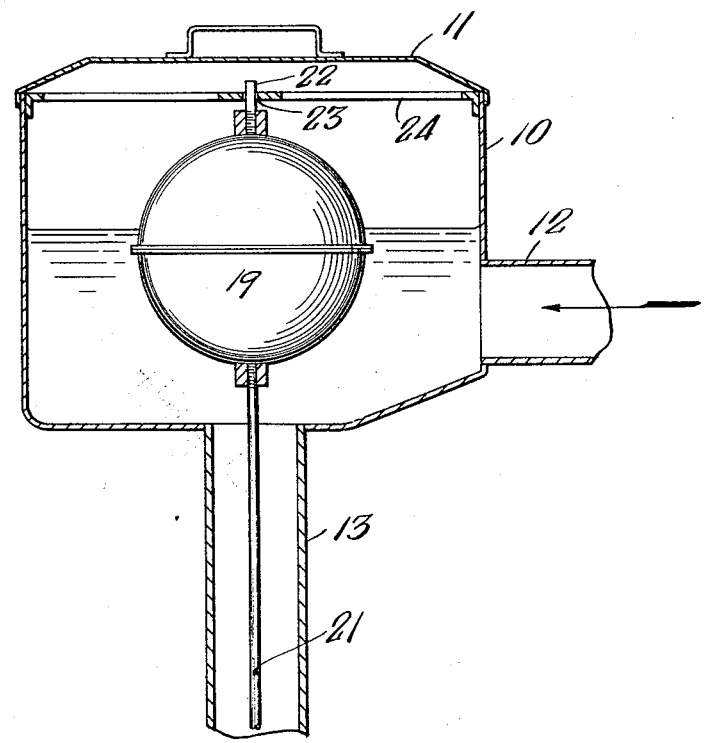
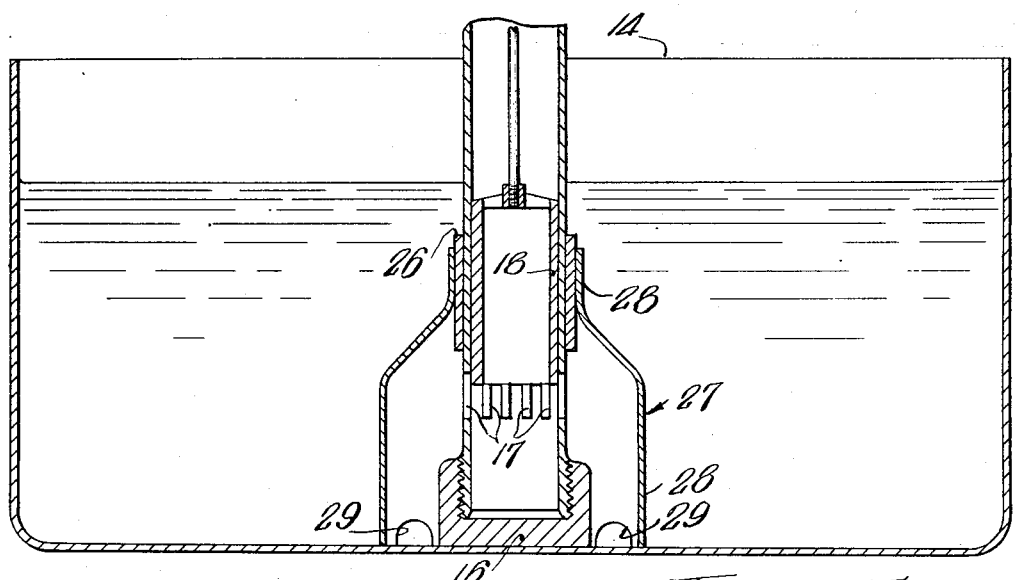
Inventor
Joseph Willmann
by Roberts Cushman & Woodberry
his Attys.

Patented Nov. 14, 1933

1,935,235

UNITED STATES PATENT OFFICE 1,935,235

FOAM PREVENTION IN TREATMENT OF MILK, ETC.

Joseph Willmann, Derby, Conn.

Application June 30, 1931. Serial No. 547,833

7 Claims. (Cl. 183—2.6)

This invention relates to eliminating foam from liquids and to a method and apparatus for attaining this objective and/or for facilitating handling, transferring or translation of liquids, or for performing various steps or operations of a process involving the use of liquid in a manner to avoid the formation of foam as well as to free the liquid from foam which may have formed therein. Foam in appreciable or objectionable amounts occurs more frequently in liquids having a relatively high surface tension as manifested by a tendency to form and/or to retain bubbles under various commonly prevalent conditions. These bubbles may be formed by dissolved gases on liberation thereof as by agitation, the application of heat, reduction of pressure, or by chemical or other internal action within the liquid. In some instances the mode of procedure of the desired process, or even the previous handling of a liquid may give rise to conditions conducive to the formation of bubbles as by causing the liquid to be exposed so as to absorb or dissolve gases from the atmosphere, or again, these gases may be merely occluded or entrapped in the liquid as by pouring, by bringing two streams together, by dispersing the liquid in or by gases, or by other forms of translation. These individual bubbles upon aggregation constitute a foam or honey-comb structure of liquid films which on the one hand may be tenaciously adherent to solid walls of containers, conduits and the like, and to each other; and on the other hand the films may exhibit marked tensile strength relative to their cross-section. Furthermore these bubbles interfere with proper flow of a fluid, particularly in systems including pumps or other fluid translating devices and/or involving measurements as of flow or volume. Moreover, as the gases forming the bubbles are uniformly relatively poor conductors of heat, it is highly desirable to avoid having bubbles occur along a heat transfer surface, as on the tubes of heat exchange apparatus, for obviously occurrences of this kind may materially reduce the thermal efficiency. While the presence of occluded gases, especially in the form of foam, may thus produce far reaching disadvantageous results, it has heretofore been very difficult and often practically impossible to prevent their formation or occurrence, even to an extent sufficient to avoid the disadvantageous effects thereof.

Difficulties of this character are encountered in handling milk at distributing plants, dairies and the like. At a plant of this kind milk is commonly received in 40 quart cans from which it may be poured into a measuring or weighing tank, being discharged from the latter into a receiving tank. It is customary to raise the milk by suitable fluid translating means such as a rotary pump from the receiving tank to a storage tank disposed at a sufficient elevation to make available an adequate gravity head for assisting in translating the milk through various continually performed stages of treatment. From the storage tank the milk is passed usually with the assistance of a pump, to a preheater which may be in the form of a tubular heat exchanger and may employ as a heating medium previously heated milk which is to be cooled as a part of the process of treatment. The heated milk then issues from this preheater into a tank or vessel in which it is maintained for the time (usually 30 minutes) and at the temperature (142° F.) prescribed for pasteurization. This stage of the process having been completed the milk may then be passed, with the assistance of another pump, through a cooler which may likewise be in the form of a tubular heat exchanger, but which is usually supplied with water as a cooling medium. The milk from this cooler is received in equalizing tanks wherein the level may rise and fall to provide for any accumulation which may take place while the milk is being bottled or otherwise prepared for delivery to consumers or users thereof.

It will be observed that at the various steps of the above treatment, as for example when the milk is poured from the 40 quart cans into the weighing tank and likewise when it is discharged from one tank to another or passed from one tank to a heat exchanger, it is subjected to conditions such as those previously pointed out herein which are conducive to the formation of foam. Furthermore as the milk passes through the fluid translating devices and to different elevations it is subjected to various degrees of pressure and also to various degrees of temperature in the preheater, pasteurizer and cooler, all of which tend to agitate the milk so as to liberate dissolved gases which have a tendency to remain entrapped or occluded on the surface in the form of foam. The formation of this foam takes place principally at points where milk issues or is discharged into a tank, and occurs irrespective of whether the milk is conducted into the tank below the surface of the liquid therein or is allowed to discharge in an unconfined stream or jet above the liquid level of the receiving tank.

According to this invention the formation of foam in milk (which is representative of liquids of the character referred to herein) may be prevented, and milk or like liquid may be freed of existing foam by passing it through a passage having an enlarged entrance or receiving chamber and maintaining the milk under a substantially constant and unvarying pressure, the latter preferably being not substantially in excess of that employed in the succeeding stage of the process or in this case the pressure to which the bottled product is to be subjected. Preferably the milk is delivered within the body of liquid at the enlarged entrance end of this passage or below the surface thereof and the pressure is maintained substantially constant by regulating the velocity or rate of flow, while the discharge end of this passage is maintained submerged in a larger body of like liquid into which milk from the passage issues below the surface of said larger body. Conveniently this may be accomplished by providing for flow by gravity through a substantially vertical passage and throttling the lower or discharge end of the passage to maintain a constant level at the upper or entrance end thereof. The downward flow of liquid should be slower than the upward trend of air bubbles so that the bubbles may rise to the surface of the body of liquid at the top of the passage. Under these conditions, foam is broken up and disappears from the surface as well as from within the body of the liquid. Milk treated in this manner is free from foam and shows no evidence of the presence of occluded gases in any form.

The single figure in the drawing is a central vertical section through a typical foam eliminator.

Apparatus exemplifying the various features by which the present invention is characterized comprises a float box 10 having a removable cover 11 and fitted with an inlet connection 12 for conducting liquid through the side of the box into a body of liquid contained therein and below the normal level of the contained liquid. The cover 11 rests or fits upon the chamber 10 and is not absolutely fluid tight so that atmospheric pressure is maintained within the chamber. The float box is also provided with a discharge connection or conduit 13 disposed centrally of the lower side thereof and extending vertically downward within and preferably substantially to the bottom of a relatively large tank 14. The lower end of this vertical conduit has threaded thereon a cap or plug member 16 which may also be affixed to the bottom of the tank 14 and which serves to close the lower end of the conduit. At a convenient point above its closed lower end the vertical conduit is provided with a circumferential row of longitudinally extending slots or ports 17 through which fluid may be discharged. Flow through these ports is controlled by a sleeve valve 18 which is adapted to reciprocate within the vertical conduit in accordance with the position of a float 19 to which the sleeve valve is connected by a rod 21. The float may also be fitted with a substantially vertically disposed guide rod 22 arranged to slide vertically in a bearing 23 carried by a spider 24 affixed within the upper portion of the float box.

The vertical conduit 13 also has slidably fitted thereon an exterior sleeve 26 to which is affixed an auxiliary pressure regulating member 27, the latter preferably diverges outwardly from a portion 28 which encompasses and fits closely about the sleeve 26 to an enlarged substantially cylindrical portion 28 having the lower end thereof positioned normally to rest upon the bottom of the larger tank. This cylindrical portion 28 has a number of ports 29 formed as notches or recesses in its lower periphery to provide for passage of liquid under normal conditions through the area provided thereby.

In operation of this device a liquid such as milk is delivered into the float box through the inlet connection 12 and passes through the vertical passage and issues from the ports at the lower end thereof into the enclosed space provided by the auxiliary pressure regulator 27, this space of course being filled with liquid. Under normal conditions with relatively slight variations in flow, the milk so delivered passes through the ports 29 into the larger body of liquid in the tank 14. Whenever, for any reason, the milk tends to flow through the ports 29 more rapidly than these ports normally will permit the auxiliary pressure regulating member 27 acts as a piston and moves bodily upwardly to balance the pressure on its upper end so as automatically to increase the effective flow area from a number of individual ports 29 to a substantially continuous annular port formed between the lower edge of the cylindrical wall 28 and the bottom of tank 14, thus avoiding any excessive or objectionable increase in pressure at this point in the system. The auxiliary pressure regulator operates in this way to maintain the pressure at these ports only sufficient to assure adequate flow with minimum disturbance.

It will be seen that the float box provides an enlarged entrance or receiving end for the passage provided by the vertical conduit 13 and that while milk or other liquid supplied into the float box may be delivered in varying quantities, the relatively large capacity of this tank provides for receiving these variable amounts of liquids without materially changing the level of liquid within the float box. Moreover the float functions automatically to control the level of the liquid in this box by raising and lowering the sleeve valve 18 so as to permit more or less of this liquid to flow out through the ports 17 and thus to maintain a substantially uniform pressure on the column of liquid in the conduit 13. As previously pointed out herein, this action is further facilitated by the auxiliary pressure regulator 27.

The cylindrical portion of the auxiliary pressure regulator 27 is spaced sufficiently from the ports 17 to permit liquid to issue freely from these ports into the body of liquid enclosed by the member 27. The separating wall provided by this member also functions to prevent surging or the creation of cross currents within the body of liquid in the tank outside of the member 27. Pulsations in pressure or areas of unequal pressure such as otherwise might be produced by flow through the ports 17 are avoided by virtue of the encompassing wall which partially at least absorbs the energy of flow and disperses or distributes the issuing liquid into the volume within it. Thus while there may be some disturbance about the ports 17 this is localized and prevented from affecting the main body of liquid in the tank. It will furthermore be evident that as in any case where one stream or jet enters another body of liquid some turbulence or surging is produced, this effect is in the present instance practically negligible within the member 27 at only a short distance above or below the ports 17 so that liquid passing through the ports 29 or across the lower end of the member 27 is substantially unaffected by any conditions or irregular flow, the flow at this point being produced by a substantially uniform pressure. It will also be apparent that while the construction illustrated is preferred, yet some of the desirable features thereof may be obtained by arranging ports such as the ports 29 at the upper instead of the lower end of a separating wall member. The liquid passing through the ports 29 enters in the tank at the very bottom thereof and as this flow is produced by a substantially downward and controlled pressure within the member 27 there is no possibility of sufficient pressure accumulating to force the liquid through the ports 29 radially or outwardly of the tank to any appreciable extent and consequently the liquid is dispersed substantially uniformly into the tank so as to enter this larger body of liquid without creating any objectionable disturbance therein.

While satisfactory results may be obtained by employing a foam eliminator of this kind only as the final stage in the preparation of milk or other liquid for subsequent use or consumption it is preferred to provide an installation with devices of this character at several intermediate points, as at each point where the liquid being treated passes from one tank or body thereof to another. The latter mode of procedure precludes the possibility of the formation of large or excessive quantities of foam such as might materially interfere with the process by causing eddy currents, and in general creating improper flow in conduits, reducing the efficiency of the fluid translating apparatus and also reducing the thermal efficiency of the heat transfer apparatus by having the entrapped gases or bubbles collect on a heat transfer surface so as to constitute in effect a heat insulating medium.

It will also be seen that the invention provides for effecting the desired results by maintaining a moving body of liquid under a substantially constant and unvarying pressure in a continually conducted process wherein the volumetric rate of flow may vary within wide limits. This is a very desirable feature for it makes it possible to provide for elimination of foam at any point in a system with the assurance that the normal cycle of operations will not thereby be retarded or interfered with in any way. It will also be understood that where only one eliminator is to be provided it need not necessarily be employed at the conclusion of a process or treatment for although in the treatment of milk as set forth herein satisfactory results are obtained in this manner it will be evident that many of the advantages of this invention may be gained by providing for elimination of foam at selected intermediate points or previous to the beginning of the treatment, should this be found desirable.

As stated above the downward flow of liquid should be slower than the upward trend of air bubbles so that the bubbles may rise to the float chamber where they are broken up by the incoming liquid. While the conditions may vary widely for different liquids, excellent results have been obtained with milk by making the tube 13 approximately seven square inches in cross-section, approximately four feet long and flowing the milk at the rate of approximately thirty-five gallons per minute.

It should be understood that the present disclosure is for the purpose of illustration only and that this invention includes all modifications and equivalents which fall within the scope of the appended claims.

I claim:

1. The method of eliminating foam from liquid which comprises establishing upper and lower bodies of liquid, delivering liquid to the upper body, conducting liquid in a substantially solid column from the upper body to a point well within the lower body, shielding the main portion of liquid in the lower body from the action of liquid as it issues from the conducting column, and controlling the flow of the conducting column to maintain the level of the upper body substantially constant to assure a substantially uniform and unvarying pressure on liquid passing to the lower body irrespective of the rate of delivery of liquid to the upper body.

2. The method of eliminating foam from liquid which comprises establishing upper and lower bodies of liquid, delivering liquid to the upper body, conducting liquid in a substantially solid column from the upper body to a point well within the lower body, shielding the main portion of liquid in the lower body from the action of liquid as it issues from the conducting column, maintaining a substantially constant pressure opposing the delivery of liquid from the conducting column, and controlling the flow of the conducting column to maintain the level of the upper body substantially constant to assure a substantially uniform and unvarying pressure on liquid passing to the lower body irrespective of the rate of delivery of liquid to the upper body.

3. The method of eliminating foam from liquid which comprises establishing upper and lower bodies of liquid, delivering liquid to the upper body, conducting liquid in a substantially solid column from the upper body to a point well within the lower body, confining the disturbing action of liquid discharging from the column to a zone in the immediate proximity of the point of discharge, controlling the pressure in this zone to maintain a substantially constant pressure opposing the discharge from the column, and maintaining a substantially constant head on the conducting column to assure a substantially uniform and unvarying pressure on liquid passing to the lower body.

4. The method of eliminating foam from liquid which comprises establishing upper and lower bodies of liquid, delivering liquid to the upper body, conducting liquid in a substantially solid column from the upper body to a point well within the lower body, confining the disturbing action of liquid discharging from the column to a zone in the immediate proximity of the point of discharge, balancing the pressure in this zone against the pressure of the main portion of the lower body of liquid to maintain a substantially constant pressure opposing discharge from the column, and maintaining a substantially constant head on the conducting column to assure a substantially uniform and unvarying pressure on liquid passing to the lower body.

5. In an apparatus for removing foam from liquid, the combination of a conduit extending within a tank and having a discharge port disposed well below the normal level of liquid in the tank, a relatively rigid member extending about the discharge port in spaced relation thereto and across the path of normal flow of liquid issuing from the port, means for supporting this member against a wall of the tank and for guiding the member for movement toward and from said wall, and means providing ports along and between the edge of said member and said wall, said member being movable away from said wall in response to pressure within said member for increasing the effective area of said ports.

6. In an apparatus for removing foam from liquid, the combination of a conduit extending within a tank and having a discharge port disposed well below the normal level of liquid in the tank, a relatively rigid member extending about the discharge port in spaced relation thereto and across the path of normal flow of liquid issuing from the port, means for supporting this member against a wall of the tank and for guiding the member for movement toward and from said wall, and means providing ports along and between the edge of said member and said wall, said member being shaped to utilize the pressure of liquid in the tank for holding said member against said wall, whereby said member may move away from said wall to provide for increased flow and to avoid a substantial increase in pressure.

7. In an apparatus for removing foam from liquid, the combination of a conduit extending vertically within a tank and having a discharge port disposed well below the normal level of liquid in the tank, a cylindrical member disposed about the conduit and having an open lower end adapted to rest on the bottom of the tank and an upper end substantially closed about the conduit and slidable thereon, and means providing ports along and between the lower end of this member and the bottom of the tank, the cylindrical portion of this member being disposed about the discharge port of the conduit for protecting the main body of liquid in the tank from the action of liquid issuing from the conduit, the upper end of this member being normally below the level of liquid in the tank, this member also being movable upwardly in response to pressure within it to raise the lower end thereof so as to provide for increased flow to the main body of liquid in the tank.

JOSEPH WILLMANN.